(12) United States Patent
Braun et al.

(10) Patent No.: US 7,309,935 B2
(45) Date of Patent: Dec. 18, 2007

(54) FAN IMPELLER FOR ELECTRICAL MACHINES

(75) Inventors: Horst Braun, Stuttgart (DE); Hans-Joachim Lutz, Lampertheim (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 10/494,803

(22) PCT Filed: Oct. 19, 2002

(86) PCT No.: PCT/DE02/03951

§ 371 (c)(1),
(2), (4) Date: Sep. 3, 2004

(87) PCT Pub. No.: WO03/040571

PCT Pub. Date: May 15, 2003

(65) Prior Publication Data

US 2005/0008483 A1    Jan. 13, 2005

(30) Foreign Application Priority Data

Nov. 9, 2001    (DE) ............................... 101 55 224

(51) Int. Cl.
*H02K 9/00*    (2006.01)
(52) U.S. Cl. .......................................... 310/62; 310/63
(58) Field of Classification Search ............. 310/62–63
See application file for complete search history.

(56) References Cited

U.S. PATENT DOCUMENTS 1,827,316 A * 10/1931 Haynsworth ................ 416/185
2,370,600 A     2/1945 Wightman
3,782,853 A     1/1974 Frister
4,488,070 A * 12/1984 Iwaki et al. .................. 310/62
4,926,076 A *  5/1990 Nimura et al. ............ 310/68 D (Continued)

FOREIGN PATENT DOCUMENTS

DE          2 049 679         4/1972

(Continued)

*Primary Examiner*—Dang Le
(74) *Attorney, Agent, or Firm*—Michael J. Striker

(57) ABSTRACT

The present invention relates to a fan wheel (11) for electrical machines, in particular for alternators of motor vehicles, with a fan disk (10) that, on its axially outwardly directed end face, has a number of fan blades (13, 18) distributed around the circumference in the shape of a circular ring, the fan blades extending away from the fan disk in the axial direction, so that cooling air beneath the fan blades can be drawn in axially and blown radially outwardly between air channels (20, 21) formed between them. One part (18) of each of the fan blades is joined in a fixed manner with the fan disk (10) via only its radially outward end section (18a), so that each inner end section (18b) is swiveled radially increasingly outwardly by a centrifugal force (22) occurring there as rotational speeds increase, to reduce the cooling air stream. To minimize not only the speed-dependent adaptation of the cooling air quantity to the cooling needs of the machine, but the flow noises as well, preferably only every second fan blade (18) is provided with an inner end section (18b) capable of being swiveled outwardly by centrifugal force (22), while the other, adjacent, first fan blades (13) are rigid along their entire length and are connected to the fan disk (10) in a fixed manner.

18 Claims, 1 Drawing Sheet

U.S. PATENT DOCUMENTS

| | | | |
|---|---|---|---|
| 5,241,230 A * | 8/1993 | Tanaka et al. | 310/62 |
| 5,693,992 A | 12/1997 | Adachi et al. | |
| 5,742,107 A * | 4/1998 | Asao et al. | 310/62 |
| 6,078,116 A * | 6/2000 | Shiga et al. | 310/60 R |
| 6,800,972 B2 * | 10/2004 | Buening et al. | 310/63 |
| 6,841,901 B2 * | 1/2005 | Bilsing | 310/62 |

FOREIGN PATENT DOCUMENTS

| | | |
|---|---|---|
| DE | 20 49 679 | 4/1972 |
| DE | 44 46 345 | 6/1995 |
| DE | 44 34 598 | 4/1996 |
| DE | 4434598 A1 * | 4/1996 |
| DE | 199 09 748 | 9/2000 |
| GB | 702287 | 1/1954 |
| JP | 54016602 A * | 2/1979 |
| JP | 03118745 A * | 5/1991 |
| JP | 04183244 A * | 6/1992 |
| WO | WO 02071576 A1 * | 9/2002 |
| WO | WO 2004106749 A1 * | 12/2004 |

* cited by examiner

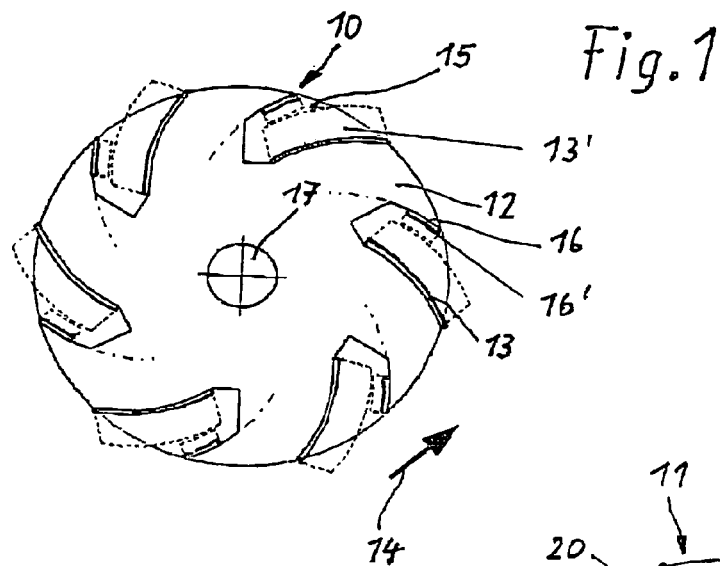
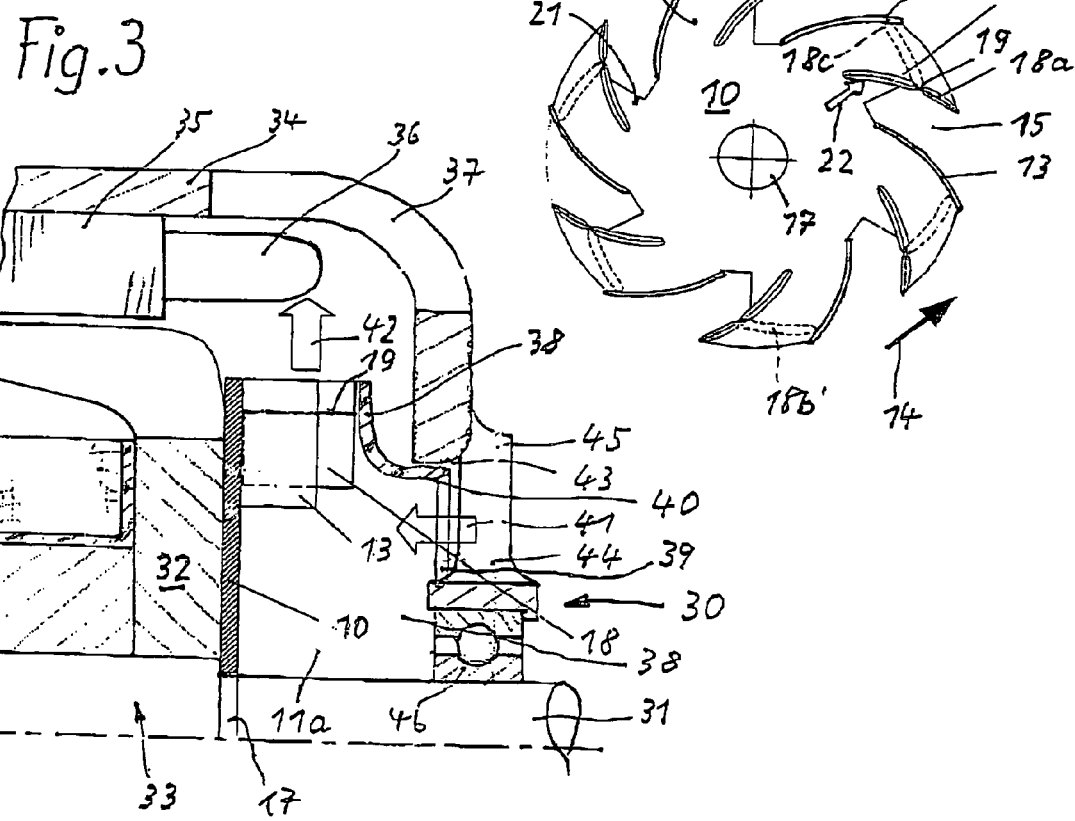

FAN IMPELLER FOR ELECTRICAL MACHINES

CROSS-REFERENCE TO A RELATED APPLICATION

The invention described and claimed hereinbelow is also described in German Patent Application DE 101 55 224.6 filed on Nov. 9, 2001. This German Patent Application, whose subject matter is incorporated here by reference, provides the basis for a claim of priority of invention under 35 U.S.C. 119(a)-(d).

BACKGROUND OF THE INVENTION

The present invention relates to a fan wheel for electrical machines, in particular alternators of motor vehicles.

The present invention relates to a fan wheel for electrical machines, in particular alternators of motor vehicles, according to the general class of claim 1.

Fan wheels are typically used to cool electrical machines, in particular alternators in motor vehicles, the fan wheels having rigid fan blades and being dimensioned such that they deliver enough cooling air, even at low rotational speeds, to dissipate the heat from power losses occurring in the electrical machine. In the case of fan wheels with rigid blades, the quantity of air conveyed increases as rotational speed increases. Since, starting at a certain rotational speed, the heat from power losses from generators in motor vehicles does not increase as drastically as it does in the lower rotational speed range, more air is conveyed by the fan wheel at higher rotational speeds that would be required to dissipate the heat from power losses. The quantity of cooling air conveyed creates disturbing sounds, particularly at higher rotational speeds. Furthermore, additional power is required from the internal combustion engine of the motor vehicle to drive the fan wheel to convey the cooling air at an unnecessarily high rate in the upper speed range.

It is known from DE-OS 20 49 679 that, to taper off the quantity of cooling air conveyed at higher rotational speeds, all of the fan blades of a fan wheel are configured such that each one is connected with a fan disk in a fixed manner only via its radially outward end section. The inner section of each fan blade is a flexible tab that is swiveled radially increasingly outwardly by a centrifugal force occurring there as rotational speeds increase. As a result, the cross section of the air channels formed by the adjacent fan blades is reduced, through which said air channels the cooling air below the fan blades that is drawn in axially is blown radially outwardly. With this means of attaining the object of the invention, although the drive power for the fan wheel is reduced as rotational speed increases and, thereby, the overall efficiency of the machine is improved, the fan blades are tilted forward from the inside to the outside in the direction of rotation such that higher pressure also builds on the flexible, outwardly swivelable tabs as rotational speed increases. Since the inwardly directed, swivelable ends of the fan blades also extend freely into the air channels at high rotational speeds, the disturbing fan noise is further increased as a result. In addition, blade oscillations occur there when the drive speed of the fan wheel fluctuates, the blade oscillations being capable of generating additional noises and resulting in material fatigue, in particular, and, therefore, to the fan blades breaking off.

With the present means of attaining the object of the invention, the aim is not only to reduce the drive power at the fan wheel at high rotational speeds, but also to markedly reduce the disturbing noises occurring there and to thereby simultaneously improve the oscillatory behavior of the fan blades.

SUMMARY OF THE INVENTION

Accordingly, it is an object of the present invention to provide a hand wheel which has advantages over the hand wheels of the prior art.

Advantageous further developments and embodiments result from the remaining features stated in the subclaims. A means of attaining the object of the invention that is particularly simple in terms of construction and manufacturing engineering is therefore achieved when the swivelable inner end section of the particular fan blade is connected with the outer end section via a hinge. The hinge is designed to be particularly reliable by configuring it as a film hinge that extends across the entire axial width of the fan blade and is made of plastic, in particular. To prevent oscillations and oscillatory noises at the swivelable inner end sections of the fan blades, each of the fan blades connected across the entire length with the fan disk in a fixed manner forms a stop against which each end of the swivelable inner end section of an adjacent fan blade bears at maximum deflection, so that the air channel formed between the two fan blades is closed by it when the fan wheel reaches a certain rotational speed. A simple and robust configuration of the fan wheel is obtained by punching and stamping the fan disk out of a sheet metal plate, whereby the blades connected in a fixed manner across their entire length with the fan disk are punched out of the sheet metal of the fan disk and bent axially outward. The remaining fan blades, each having a swivelable inner end section, are advantageously made of plastic. To obtain a high degree of inherent stability of these fan blades, the plastic of each outer end section is coated via injection molding around a holding clip, the holding clip being punched out of the sheet metal plate of the fan disk and bent axially outward.

A particularly aero configuration of the fan wheel results by connecting all outer end sections of the fan blades having swivelable inner end sections with each other via a cover disk that is located on the axially outer end face of the fan blades, diametrically opposed to the fan disk. To ensure the quietest possible entry of the cooling air into the fan wheel, the cover disk is advantageously provided with a central opening and an axially outwardly directed inflow funnel integrally molded therewith. This further results in the possibility of preventing a portion of the cooling air flowing out of the fan wheel from returning to the inflow funnel by the fact that the inflow funnel of the cover disk is capable of being inserted into a central opening of a bearing plate of the electrical machine with a narrow air gap. This narrow air gap prevents a bypass for the cooling air on the fan wheel. A particularly simple configuration of the fan wheel results from the fact that the cover disk and the fan blades having a swivelable inner end section are manufactured as a single component out of plastic.

In the case of an alternator with claw-pole rotor, in order to also dissipate the heat from power losses generated there via the pole wheel, the fan disk—in an advantageous configuration of the invention—is fastened on the end face of a pole disk of the claw-pole rotor in a thermally conductive manner, and it is preferably welded to it.

By arranging the fan blades with and without a swivelable inner end section in an alternating manner, only every second air channel between the fan blades is reduced by a swivelable inner end section of a fan blade as rotational speed increases and is closed completely starting at a certain rotational speed, whereas, in contrast, the cross section of the particular adjacent air channel remains unchanged in the outer region of the fan wheel. By selecting the distance of each fan blade having a swivelable inner section from the particular rigid fan blade located before or after it in the direction of rotation, the ratio of the cross sections of a closeable air channel and the adjacent, non-closeable air channel between the fan blades may be adapted to the particular needs for the use of the fan wheel. When the fan wheel is used in generators for motor vehicles, the distances between each of the fan blades is advantageously selected to be nearly equal in size, so that, when the swivelable inner end sections are at maximum deflection, the flow cross section between every three adjacent fan blades is reduced by approximately 50%. An aero and, therefore, quiet arrangement of the fan blades further results from the fact that they are tilted, from the radial direction outward, against the direction of flow and are bent backward. Since the fan blades having a swivelable inner end section are preferably manufactured out of plastic in an injection mould, the cooling air quantity conveyed radially outwardly by the fan can be advantageously increased by the fact that the axial extension of the fan blades having a swivelable inner end section is greater than the axial extension of the fan blades connected along the entire length with the fan disk in a fixed manner and preferably bent outward from the sheet metal of the fan disk.

Further details of the invention are explained in greater detail in the exemplary embodiments described hereinbelow with reference to the associated drawing.

BRIEF DESCRIPTION OF THE DRAWINGS

FIG. 1 shows a fan disk for manufacturing a fan wheel according to the invention, in a top view, FIG. 2 is a finished fan wheel without cover disk, and FIG. 3 is a longitudinal sectional view through the top rear half of an alternator for motor vehicles with a fan wheel according to the invention, with cover disk.

DESCRIPTION OF THE PREFERRED EMBODIMENTS

FIG. 1 shows the top view of a fan disk 10 for manufacturing a fan wheel 11 according to FIG. 2. Circular fan disk 10 is stamped out of a sheet metal plate 12 made of sheet steel, whereby it has a certain number of first fan blades 13 distributed around the circumference on its front, axially outwardly directed end face. Fan blades 13 are stamped out of the sheet steel of fan disk 10 and are bent outwardly axially frontward. Fan blades 13 are also tilted, from the inside to the outside in the radial direction, against the direction of rotation of fan wheel 10—indicated by an arrow 14—and are also bent backward. Before fan blades 13 are bent outwardly, they are located in the plane of fan disk 10, as indicated in FIG. 1 with dotted lines and labeled with reference numeral 13'. A stamped-out area 15 exists for each of these fan blades 13 on the circumference of fan disk 10. Each of these stamped-out areas 15 further includes a holding clip 16—that is also stamped out there out of sheet metal plate 12 of fan disk 10 and is bent outwardly axially toward the front—that extends into stamped-out area 15 before being bent upward and is indicated with a dotted line labeled with reference numeral 16'. A central opening 17 of fan disk 10 serves to accommodate a drive shaft.

FIG. 2 shows the finished fan wheel 11 in the front view, whereby further and/or second fan blades 18 are located between each of the first blades 13 described in FIG. 1. Each of these second fan blades 18 has an outer end section 18a and an inner end section 18b that are interconnected via a hinge 19. These second fan blades 18 also extend away from fan disk 10 in the axial direction toward the front and tilt, from the inside toward the outside in the radial direction, against the direction of rotation 14, and are bent backward. As a result, when fan wheel 11 rotates, the cooling air beneath fan blades 13 and 18 is drawn in axially and blown radially outwardly through air channels 20 and 21 formed between them.

The second fan blades 18 are composed of plastic, whereby the plastic of each outer end section 18a is coated via injection molding around holding clip 16, the holding clip being punched out of the sheet metal plate of the fan disk and bent axially outward. As a result, each of the second fan blades 18 is connected with fan disk 10 in a fixed manner only via its radially outward end section 18a. Its inner end section 18b is designed to swivel via hinge 19, so that each inner end section 18b of second fan blades 18 is swiveled increasingly radially outward by a centrifugal force 22 occurring there as the rotational speeds of fan wheel 11 increase. As a result, the cross section of first air channel 20 formed with the adjacent, stationary, first fan blade 13 is reduced. Hinges 19 are each configured as a film hinge extending across the entire axial width of second fan blades 18 and are composed of plastic. The return force for swivelable, inner end section 18a of second fan blades 18 can be adjusted via the thickness and toughness of the plastic material at hinges 19 in such a manner that the desired, rotational speed-dependent reduction in cross section of first air channels 20 is attained as a function of centrifugal forces then acting on inner end sections 18b. Since first fan blades 13 are connected across their entire length with fan disk 10 in a fixed manner and, therefore, only every second fan blade 18 has an inner end section 18b capable of being swiveled outwardly by centrifugal force, first fan blades 13, by being arranged accordingly, each forms a stop 23 against which each end 18c of swivelable inner end section 18b of an adjacent second fan blade 18 bears at maximum deflection, as indicated in FIG. 2 with a dashed line having reference numeral 18b'. The rotational speed of fan wheel 11 required for this can also be adjusted via the flexural stiffness of hinge 19, so that, when this predetermined rotational speed is reached, air channel 20 formed between the two fan blades 13 and 18 are closed by it. In the exemplary embodiment according to FIG. 2, the distances between fan blades 13 and 18 are nearly equal in size, so that, when inner end sections 18b of second fan blades 18 are at maximum deflection, the flow cross section between every three adjacent fan blades— and, therefore, the entire throughput of cooling air—is reduced by nearly one-half.

FIG. 3 shows a cross section of a fan wheel 11a, according to the invention, in an alternator 30 for motor vehicles, whereby only the rear top half of alternator 30 is visible, shown enlarged in a longitudinal cross section. There, fan disk 10, with its central opening 17, is mounted on a generator shaft 31 and welded via its back side to the end face of a pole disk 32, which is part of a claw-pole rotor 33 and which is surrounded by a stator 35 having an alternating-current winding 36, the stator having been inserted in housing 34. Fan wheel 11a serves there to outwardly dissipate the heat from power losses generated in claw-pole rotor 33 and heat from power losses of alternator 20 generated in stator 35 through ventilation slits 37 in housing 34. To attain the most effective air cooling possible, it is provided on fan wheel 11a that all outer end sections 18a of second fan blades 18 are interconnected via a cover disk 38. This cover disk 38 is located on the axially outward end face of second fan blades 18, so that they are diametrically opposed to fan disk 11a. Cover disk 38 is provided with a central opening 39 that is configured with an axially outwardly directly inflow funnel 40 for the cooling air. With this exemplary embodiment, cover disk 38 and fan blades 18 having an swivelable inner end section 18b are made as a single component of plastic. When claw-pole rotor 33 rotates, a cooling air stream 41 is drawn in axially by fan blades 13 and 18 through inflow funnel 40 and is blown through cooling channels 20 and 21 in a cooling air stream 42 that is evenly distributed around the circumference and oriented radially outwardly toward the rear winding head of three-phase winding 36, from where it passes through ventilation slits 37 and out of housing 34 of the machine. The heat from power losses in claw-pole rotor 33 is directed via heat dissipation of the material to the fan wheel and, from there, it is given off to the cooling air. The heat from power losses in stator 35 of the machine is largely dissipated via radial cooling air stream 42 from the winding head of three-phase winding 36, whereby the remaining portion is given off to the outside air via conduction from housing 34. To achieve the greatest possible throughput of cooling air in the lower rotational speed range, fan wheel 11a is configured such that the axial extension of the second fan blades 18—formed via injection molding of plastic—is greater than the axial extension of the first fan blades 13, which are connected in a fixed manner across the entire length with fan disk 10. In addition, the arrangement of cover disk 38 with inflow funnel 40 prevents the warmed cooling air from flowing back to the inflowing cooling air by the fact that inflow funnel 40 of cover disk 38 is inserted in a further central opening of a bearing plate 45 of the electrical machine with narrow air gap 43, in which said further central opening the back end of the generator shaft is accommodated in a bearing 46.

The combination of metallic fan blades 13 and plastic fan blades 18 makes it possible—due to the plastic, in particular—to create an aero shape while simultaneously providing a good thermal connection of the rotor to the cooling air via metallic fan disk 10. In addition, hinge 19 on plastic fan blades 18 may be configured—via a locally reduced material thickness—such that the mechanics of the fan are neither complicated nor sensitive to contamination. As a result of the alternating arrangement of fan blades with and without swivelable inner end section 18b, the air flow is never completedly interrupted, even when the swivelable inner end section bear against their stops 23, so that a minimum cooling air stream via air channels 21 is always ensured. The backwardly bent fan blades 13 and 18 ensure a high degree of fan efficiency combined with a low specific noise level of the fan wheel. Finally, cover disk 38 also contributes to a quiet airflow, because it prevents air vortexes and pressure losses in its bell-shaped inflow funnel 40 while simultaneously allowing greater freedom in the design of bearing plates of the electrical machine. Relatively great axial tolerances are also possible without the conveying capacity of the fan wheel being influenced as a result.

In the case of the exemplary embodiments of the fan wheel according to FIG. 2 and FIG. 3, fan disk 10 is the insert for an injection mould for creating plastic fan blades 18, including cover disk 38, via injection molding. As an alternative, however, fan disk 10 and the injection mould composed of cover disk 38 with plastic fan blades 18 can be fabricated separately, then joined via riveting, bonding or welding before or during final assembly on the rotor of the electrical machine. To improve thermal conduction, fan disk 10 can be manufactured out of sheet aluminum and pressed axially onto the rotor of the machine using a thrust ring. In an advantageous embodiment of plastic fan blades 18, they are connected in a fixed manner with fan disk 10 and with cover disk 38 across only nearly one-third to one-fourth of their length, so that the rest of inner end section 18b extends freely into the particular air channel.

What is claimed is:

1. A fan wheel for electrical machines, in particular for alternators of motor vehicles, with a fan disk (10) that, on its axially outwardly directed end face, has a number of fan blades (13, 18) distributed around the circumference in the shape of a circular ring, the fan blades extending away from the fan disk in the axial direction, so that cooling air below the fan blades can be drawn in axially and blown radially outwardly between air channels (20, 21) formed between them, whereby each of the fan blades is joined in a fixed manner with the fan disk via only its radially outward end section (18a), so that each inner end section (18b) is swiveled radially increasingly outwardly by a centrifugal force (22) occurring there as rotational speeds increase, thereby reducing the cross section of an air channel (20) formed with the adjacent air blade (13), wherein, only one part (18) of the fan blades (13, 18) has an inner end section (18b) capable of being swiveled outwardly by centrifugal force (22), while the other fan blades (13) are rigid along their entire length and are connected to the fan disk (10) in a fixed manner wherein the fan disk (10) consists of a sheet metal plate (12), whereby the rigid fan blades (13) are connected with the fan disk (10) in a fixed manner, and wherein the fan blades (18) with the swiveable inner end section (18a) are composed of plastic, whereby the plastic of the outer end section (18b) coats a holding clip (16) in each case, and the holding clip is connected with the fan disk (10) in a fixed manner.

2. The fan wheel as recited in claim 1, wherein only every second fan blade (18) has an inner end section (18a) capable of being swiveled outwardly, while the adjacent, first fan blades (13) are connected in a fixed manner with the fan disk (10) along their entire length.

3. The fan wheel as recited in claim 2, wherein the swivelable, inner end section (18b) of the second fan blades (18) is connected with the outer end section (18a) via a hinge (19).

4. The fan wheel as recited in claim 3, wherein the hinge (19) is a film hinge extending across the entire axial width of the fan blades (18) and is composed of plastic in particular.

5. The fan wheel as recited in claim 1, wherein each of the rigid fan blades (13) that is connected with the fan disk (10) in a fixed manner forms a stop (23) against which each end (18c) of the swivelable inner end section (18b) of an adjacent fan blade (18) bears at maximum deflection, so that the air channel (20) formed between the two fan blades (13, 18) is closed by it.

6. The fan wheel as recited in claim 1, wherein all outer end sections (18a) of the fan blades (18) having a swivelable inner end section (18b) are connected with each other via a cover disk (38) that is located on the axially outer end face of the fan blades (18) and is diametrically opposed to the fan disk (10).

7. The fan wheel as recited in claim 6,
wherein the cover disk (38) is provided with a central opening (39) with an axially outwardly directed inflow funnel (40) for the cooling air.

8. The fan wheel as recited in claim 6,
wherein the cover disk (38) and the fan blades (18) having a swivelable inner end section (18b) are manufactured as a single component out of plastic.

9. The fan wheel as recited in claim 1,
wherein the fan disk (10) is fastened to the end face of a pole disk (32) of a claw-pole rotor (33) of the electrical machine (30) in a thermally conductive manner, and it is preferably welded to it.

10. The fan wheel as recited in claim 1,
wherein the distances between the fan blades (13, 18) are nearly equal in size, so that, when the swivelable inner end sections (18b) of the second fan blades (18) are at maximum deflection, the flow cross section between each of the three adjacent fan blades (13, 18) is reduced by about half.

11. The fan wheel as recited in claim 1,
wherein the axial extension of the fan blades (18) having a swivelable inner end section (18b) is greater than the central extension of the fan blades (13) that are connected in a fixed manner with the fan disk (10) along its entire length.

12. The fan wheel as recited in claim 1,
wherein the fan blades (13, 18) are tilted against the direction of rotation (14), and are preferably bent backward.

13. An alternator for motor vehicles with a claw-pole rotor (33) having at least one pole disk (32),
wherein a fan wheel with the features of claim 1 is fastened to the outer end face of the at least one pole disk (32).

14. The fan wheel as defined in claim 1, wherein the fan disk (10) is configured as a part which is punched and stamped out of a sheet plate (12).

15. The fan wheel as defined in claim 1, wherein the rigid fan blades (13) are configured as parts which are punched out of the sheet metal plate (12) and bent axially outwards.

16. The fan wheel as defined in claim 1, wherein the plastic of the outer end section (18b) is configured so that it coats around a holding strip (16) as an injection molding part.

17. The fan wheel as defined in claim 1, wherein the holding clip is configured as a part which is punched out of the sheet metal plate (12) of the fan disk (10) and bent outward.

18. A fan wheel for electrical machines, in particular for alternators of motor vehicles, with a fan disk (10) that, on its axially outwardly directed end face, has a number of fan blades (13, 18) distributed around the circumference in the shape of a circular ring, the fan blades extending away from the fan disk in the axial direction, so that cooling air below the fan blades can be drawn in axially and blown radially outwardly between air channels (20, 21) formed between them, whereby each of the fan blades is joined in a fixed manner with the fan disk via only its radially outward end section (18a), so that each inner end section (18b) is swiveled radially increasingly outwardly by a centrifugal force (22) occurring there as rotational speeds increase, thereby reducing the cross section of an air channel (20) formed with the adjacent air blade (13),
wherein, only one part (18) of the fan blades (13, 18) has an inner end section (18b) capable of being swiveled outwardly by centrifugal force (22), while the other fan blades (13) are rigid along their entire length and are connected to the fan disk (10) in a fixed manner,
wherein all outer end sections (18a) of the fan blades (18) having a swivelable inner end section (18b) are connected with each other via a cover disk (38) that is located on the axially outer end face of the fan blades (18) and is diametrically opposed to the fan disk (10),
wherein the cover disk (38) is provided with a central opening (39) with an axially outwardly directed inflow funnel (40) for the cooling air,
wherein the inflow funnel (40) of the cover disk (38) is capable of being inserted into an opening (44) of a bearing plate (45) of the electrical machine (30) with narrow air gap (43), the opening being concentric with the inflow funnel.

* * * * *